Patented July 16, 1929.

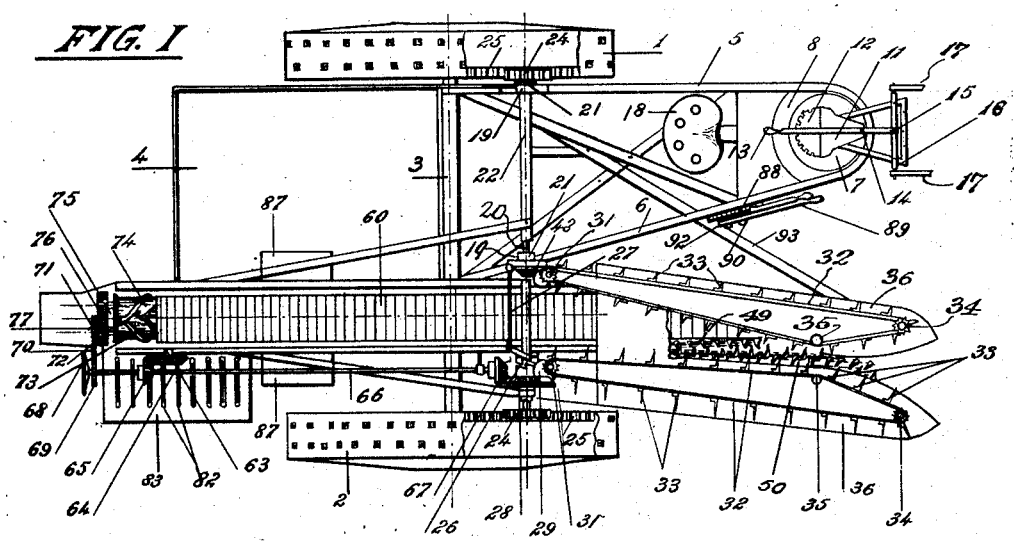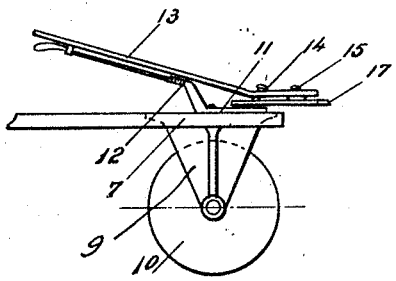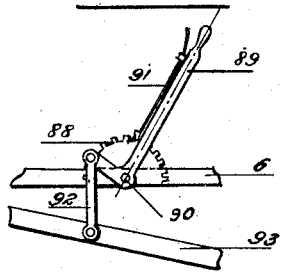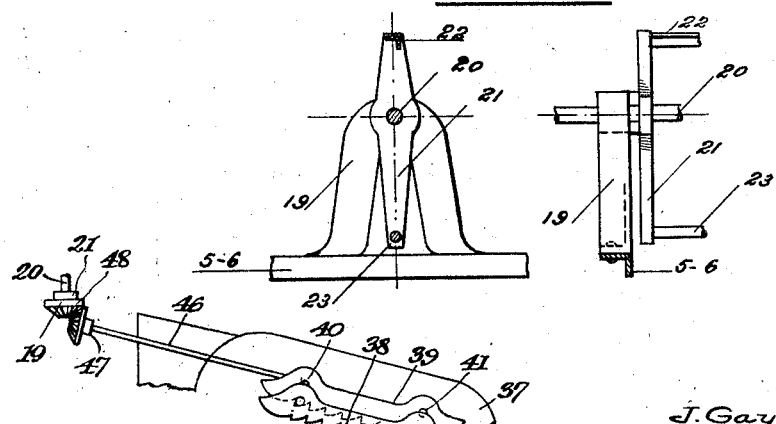

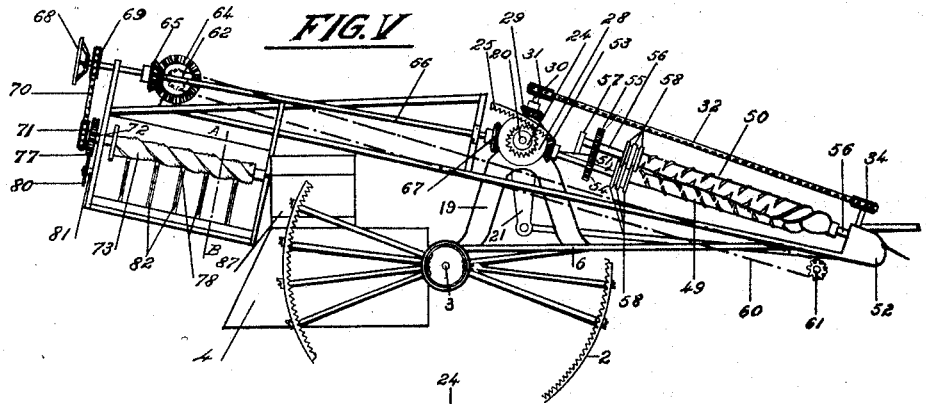
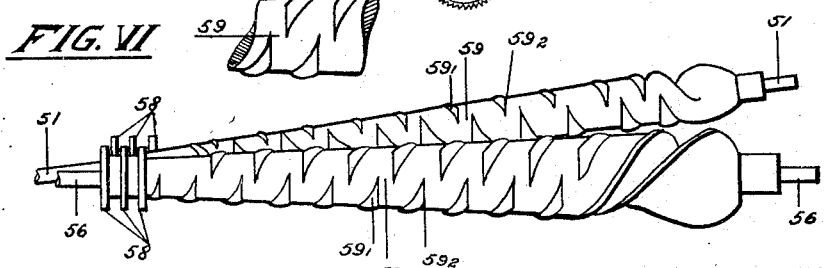
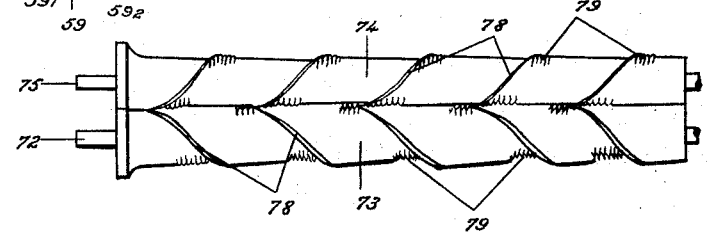
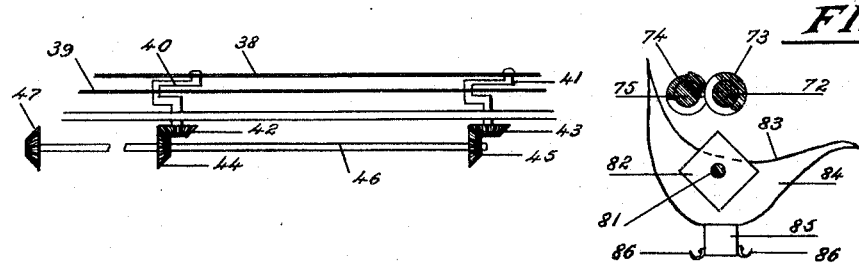

1,721,387

UNITED STATES PATENT OFFICE.

JOSE GAYRAUD AND JUAN VICTOR CASTERAN, OF BUENOS AIRES, ARGENTINA.

CORN GATHERER AND HUSKER.

Application filed October 24, 1923. Serial No. 670,528.

The present invention relates to a new type of corn gathering, snapping and husking machine and has for its main object to provide an improved machine whereby the aforementioned operations may be effected automatically, thereby considerably reducing the cost of harvesting.

The machine according to the present invention is actuated from its road wheels and the different mechanisms may be operated, or rendered inoperative, at will. The road wheels secured to a main shaft mounted on a suitable frame actuate all the different mechanisms of the machine through adequate gearing so that when the machine is being dragged along over the field the corn stalks are seized by the teeth of two endless chains which lift the plants or stalks up, after they have been pulled up from the ground, conveying them to a set of specially formed cylinders which, in turn, remove the ears from the stalks moving the latter downwardly and feeding the ears to a conveying belt whereby they are delivered to a further set of cylinders which effect the husking operation, whereafter the cleaned ears are dropped into a container or chest where they are collected for the purpose of being placed in bags. Simultaneously, these cylinders or huskers effect the expulsion of the corn husks and a curved collecting device, situated below the aforementioned cylinders, collects any grains that might be separated during the husking operation and which are received in a bag conveniently disposed for the purpose.

The aforementioned gathering means and snapping cylinders are enclosed within suitable covers or casings one end of which is positioned near the ground, the ends of both these covers forming an obtuse angle so as to facilitate the gathering of the corn plants. The said cylinders are of enlarged conical shape and their narrower ends are positioned at a higher level than their remaining portions, their relative position being side by side but at their upper ends a certain portion of one of them is superimposed to the other one. On their surfaces these cylinders are formed with spirally arranged projections, cut away at regular intervals, so that these cut away parts or notches form sharp edged angles and when these cylinders are in their working position, the spiral projections of one of them engage with the notches of the other one, whereby the corn stalks are pressed, the husks are cut and the ears pulled off and thus in condition to be husked by means of a further set of cylinders situated at the upper part of the machine. The action of these cylinders which separate the ears from the stalks, in view of the arrangement combining the cut away parts of one cylinder with the spiral projections on the other one, may be compared with that of shears as it should be taken into account that the said cylinders revolve in opposite directions. Thus when the corn plants are acted upon by these cylinders, the stalks are moved downwardly and the ears are pulled off whatever may be their form, size or position relative to the cylinders and therefore, this constitutes one of the characteristic features of the invention.

A further feature of the invention resides in the special disposition and construction of the husking cylinders, where the ears arrive after passing the conveying band. The movement of these cylinders is similar to that of the aforementioned cylinders, that is to say, they rotate in opposite directions.

These cylinders or huskers, situated one adjacent the other one, are formed with projections so disposed that the projections from one cylinder adapt themselves within the notches on the other one and further, their surfaces are provided with threads cut away at certain intervals, this arrangement being such that the notches of one cylinder do not coincide with those on the other one, the depth of these notches or cut away parts increasing towards the threads.

By means of the foregoing construction the thorough and rapid husking of the ears is attained without breaking the ears or damaging them otherwise.

Another important feature resides in the construction and disposition of the husk-expelling mechanism which is situated below the aforementioned cylinders and consists of quadrangular plates rotatably mounted on shafts and have for their object to remove and expel the husks towards the exterior. It will be seen that this mechanism, in conjunction with the husking cylinders, fulfills an important function which takes place within a collecting box or curved device provided with an aperture for the purpose of discharging into a bag the corn grains that eventually may have been separated from the ears. Thus, this ensemble includes the automatic husking of the ears, the expulsion of the husks, the supply of the cleaned ears to the container and collection of corn grains separated from the ears.

Further, the present invention is characterized by the provision of a metallic conveyor band for the ears, consisting of two chains conveniently spaced apart, the links of which are connected each to another by specially formed plates engaging the inner side of the links on each chain, and the transversal edges of the plates are hinged each to another thus forming a continuous even bottom which will retain any grain separated when the ears are torn off from the stalks.

Further important features of the invention are:—The adjusting mechanism for the height of the gathering mechanism relative to the ground, provided inside the inclined protecting covers at the lower end of the machine, the clutch mechanism in connection with the driving shaft whereby the different parts of the machine are actuated or rendered inoperative and the steering mechanism for changing at will the direction of the machine; these three mechanisms are actuated by means of levers positioned near the seat for the operator.

To demonstrate the operation of the machine, provision is made of a hand wheel secured to one of the upper shafts of the mechanism, whereby all its parts may be actuated, which will assist in explaining to interested parties the action of the machine.

A further important feature of the invention resides in a modification of the aforementioned gathering means in connection with the snapping cylinders, and which consists in the substitution for the teeth on the endless chains which forward the plants to the cylinders, of a mechanism having a shaft actuated by a pinion which engages with a gear on the driving shaft and provided with two pinions engaging with bevel gears keyed to two bell crank levers carrying a set of combs effecting alternative longitudinal movements which engage the corn plants pushing them towards the snapping cylinders; in the accompanying drawings this modification is shown as applied to one of the covers of Fig. I, and a detail view of this mechanism is more clearly illustrated by Fig. VIII.

The machine according to the present invention may be dragged along the ground by means of horses or either by a tractor or any other suitable means, and the same effects automatically the snapping and husking of the corn and the filling of the bags and it is believed that heretofore no other machine has been devised effecting the same operations without the necessity of employing a considerable number of labourers.

This improved corn gathering and husking machine may be easily operated and adapts itself readily to any conditions of the ground, all its parts being so constructed and arranged as to ensure the maximum of satisfaction during operation.

With the aid of the present improved machine, the corn crop may be effected rapidly with very little expense, as two men are sufficient to render an output of more or less one hectare per day of 8 working hours.

On the accompanying drawings, which illustrate the invention in one preferred form of embodiment:—

Fig. I is a top plan view of the machine according to the invention, Fig. II is a side elevation of the steering device, Fig. III is the height adjusting mechanism for the snapping device and the Fig. IV illustrates the balance-beam supporting the said mechanism.

Fig. V is a side elevation of the machine showing the snapping mechanism and a detail of the device preventing the reversion of the mechanism, Fig. VI illustrates the construction and relative position of the snapping cylinders and a detail of their normal threads.

Fig. VII is an elevation of the husking cylinders, Fig. VIII is a front view of the modified construction of the gathering mechanism, shown in Fig. I, and Fig. IX is a cross-section on line A—B of Fig. V.

Fig. X is a top plan view of a modification of the gathering mechanism shown in Fig. VIII.

Referring to the drawings, the improved corn gathering and husking machine according to the invention consists of two main parts, the truck and the gathering and husking mechanism. The road wheels 1—2, of suitable shape and dimensions, are mounted on a shaft 3 carrying the container or chest 4 for the ears and the U-shaped bar or frame 5—6, at the curved or bent part of which is provided the steering device formed by a disc 7 rotatably mounted within the guide plate 8. Said disc 7 is secured to the bracket 9 to which is pivoted the wheel 10. At the upper part of the disc 7 is provided a member 11 (Figs. I and II) having the locking quadrant 12. A lever 13, embracing the stop 14 secured to the member 11, is connected by means of the pin 15 to the rod 16.

The rods 16—17 serve for the attachment of the horses, and near the hand lever 13 is provided a seat 18 for the operator.

On the U-shaped bar 5—6 are fixed the brackets 19 supporting the balance-beams 21 constituting bearings for the driving shaft 20 and supporting the gathering mechanism through bars 22—23. At each end of driving shaft 20 are provided the gears 24 engaging with a circular rack 25 provided at the inner circumference of the road wheels 1—2. Further, the driving shaft 20 is provided with the clutch mechanism 26 actuated by lever 27 so as to render the snapping mechanism operative or inoperative at will. The bevel gear 28, keyed to shaft 20 near the road wheel 2, imparts motion to the gathering mechanism engaging with pinion 29 secured to a shaft 30 to the upper end of which is secured the pinion 31 engaging with the endless chain 32. This chain 32 is guided around the pinion 34 and roller 35 and the whole of the hereinbefore described mechanism is enclosed within a metallic protecting cover 36.

The other cover 37 encloses normally a similar gathering mechanism, while in Fig. X there is shown a modified construction which is illustrated in elevation in Fig. VIII. This modified gathering device consists of two combs 38—39, mounted on crank shafts 40—41, as shown in Fig. VIII, and said crank shafts 40—41 carry the pinions 42—43 engaging with the toothed wheels 44—45 secured to the driving shaft 46 which carries also the pinion 47 engaging with the toothed wheel 48 keyed to driving shaft 20.

The snapping cylinders 49—50 constitute the collecting mechanism, and of these the cylinder 49 is formed with a double spiral, the threads 59 of which are so formed that each of the cut away portions 59 constitute a cuneiform knife or cutter $59^2$; the compressing cylinder 50, of similar construction to the former, but of larger diameter (proportion of two to three) is formed with a triple spiral also cut away at 59, but in opposite direction than that of the cylinder 49 in order to combine the threads of both cylinders so that during their rotation in opposite directions each three revolutions of the smaller cylinder 49 correspond with two revolutions of the larger cylinder 50.

When these cylinders are rotated, the cutters $59^2$ of the cylinder 49 engage with those on the other cylinder 50 thereby constituting rotative shears which, when the corn ears are supplied end forward, cut and open the husk of the latter compressing them and moving the stalks downward but holding the ears thus separating them therefrom.

The relative position of the hereinbefore described cylinders is illustrated in Figs. I, V, and VI. The cylinder 49 is positioned with its upper end below the corresponding end of cylinder 50 and the other ends or heads of both cylinders are at the same level. The cylinder 49 is formed with a shaft 51 the lower end of which is supported in a suitable bearing at 52, and its upper end carries a pinion 53 engaging with the toothed wheel 28. This shaft 51 also carries a further toothed wheel 54 engaging with the toothed wheel 55 keyed to the shaft 56 of cylinder 50 both ends of which are supported in suitable bearings at 52 and 57. In order to improve the operation of these cylinders 49 and 50, at their upper ends they are provided each with three annular guiding flanges 58 and the threads of said cylinders are formed with notches 59.

Below and laterally to the aforementioned snapping cylinders 49—50, is provided the endless elevating band 60, guided around the pinions 61—62. This metallic elevating band is formed of two chains engaging, respectively, with the teeth of two pairs of pinions 61—62. Between said chains, and connected to the links of both of them is provided a series of plates hinged each to another so as to provide a flexible, continuous band which will retain any grain separated from the ears.

The sets of pinions 61—62 are arranged each on a common shaft 63, to the end of which is keyed a bevel gear 64 engaging with pinion 65 of the shaft 66 provided at its lower end with a pinion 67 engaging with the toothed wheel 28. At the upper end of shaft 66 is provided the hand wheel 68, the sole object of which is to actuate the whole mechanism by hand to demonstrate its operation. The toothed wheel 69 secured to the shaft 66 engages with an endless chain 70 engaged also by a further gear 71 from the shaft 72 of the husker 73, this being clearly shown in Fig. VII, which also illustrates the other cylinder 74 with its shaft 75 provided with a gear 76 engaging with toothed wheel 77 of the shaft 72.

The aforementioned peeling cylinders 73—74 present certain characteristics which may be readily appreciated on Fig. VII.

The projections of one of these cylinders adapt themselves within the notches of the other one and both of them are formed with threads 78 and notches 79 in normal relation with their longitudinal axes and so arranged that the edges of one cylinder do not combine with the edges of the other one, the depth of these notches increasing towards the threads 78. The gear 77 engages with gear 80 secured, below the latter, to shaft 81, which carries at certain intervals the metallic plates 82 projecting through slots a certain distance beyond the upper curved wall 83 of a specially formed container or chest 84 traversed in its full length by shaft 81.

The bottom of this chest is also of curved shape and the whole is inclined forwardly so as to cause the grains separated from the ears during the peeling operation to fall through an aperture 85 provided at this end, near to which provision is made of the hooks 86 for securing thereto a bag or the like. The cylinders 73—74 are given a forward inclination so as to cause the ears to slide towards the guiding channel 87 and thence into the chest or container 4.

In order to permit of the snapping mechanism being adjusted in its height relative to the ground, the bar or frame 6 is provided with locking quadrant 88 and the two armed lever 89 pivoted on shaft 90. The shorter arm of lever 89 supports one end of the bar 92 the other end of which is connected to the bar 93 by means of a pin, thereby maintaining in position the front portion of the gathering mechanism. In order to provide for the uniform power transmission from the road wheels when the direction of the machine is changed and also to prevent reversion of the mechanism in case the machine is moved backwards, provision is made of the device shown in Fig. 5 consisting of a disc 94 provided with four teeth and fixed or keyed to the driving shaft 20. The wheels 24 are provided with ratchets 95 preventing the driving shaft 20 from being rotated other than in the forward direction.

The corn harvesting machine according to the present invention may be dragged along over the ground either by horses or by any other suitable means, such as a tractor or the like. Or, the machine itself may be provided with an internal combustion machine suitably coupled with shaft 3.

When the machine moves over the ground, the road wheels 1—2 impart motion, through their circular racks 25, to gears 24 keyed to shaft 20 thereby rotating the gear 28 in the same direction. This gear 28 engages with gear 31 on shaft 30 through pinion 29. The gear 31 impels the endless chain 32 guided by toothed wheel 34 and roller 35 so that the gathering pins or teeth 33 gather the corn plants dragging them towards the snapping cylinders 49—50. This operation is assisted by the simultaneous advancing of the machine and by the arrangement of the protecting covers 36—37 forming an angle opening towards the front of the machine.

The cylinder 49 is actuated by the aforementioned gear 28 through pinion 53 keyed to shaft 51 and this motion is transmitted to the other cylinder 50 by means of gears 54—55 which thus rotates in an opposite direction to that of cylinder 49. As aforesaid, the corn plants or stalks are drawn towards and in between the cylinders 49—50 until the arrival of the ears, then the cutting edges $59^2$ cut the husk and the cylinder 50 compresses and expels the ear. It will be clear that even when the ears arrive at the cylinders in any other position the same effect will be attained, and this would be impossible without the provision of the cutting edges $59^2$, as the ear could not be separated from the closed husk compressed at its point by the cylinder. Owing to the relative position of cylinders 49—50, the ears separated as hereinbefore described slide over the cylinder 49 and on the metallic elevating band 60 which moves in an upward direction actuated by gear 28 and pinion 67, shaft 66 and gears 64—65. The separated corn ears are thus conveyed to the upper part of the machine and thence fall on to the husking cylinders 73—74 actuated by the endless chain 70 and pinion 69 of shaft 66 transmitting motion to cylinder 73 through pinion 71. The motion is transmitted from cylinder 73 to cylinder 74 through gears 76—77, thus both cylinders rotate simultaneously but in opposite directions. As a result, the husks of the ears are engaged by the teeth 79 and dragged downwards between both cylinders until arriving at the bottom 83 together with the corn grains which might have been separated during the foregoing operation and which fall onto the bottom of the container 84 and, owing to gravity, are discharged through an aperture 85 into a bag secured to the hooks 86.

The said corn grains fall down through slots within which rotate the metallic plates 82 on their shaft 81 actuated by means of the gears 77—80.

These metallic plates rotate in a clockwise direction (Fig. IX) and thereby remove the husks on the bottom 83 pushing them outwards.

The cleaned corn ears slide over the cylinders 73—74 towards the channel 87 owing to the inclination of the said cylinders and are discharged into the container 4 and thence into suitably arranged bags.

Within the protecting cover 37 (Fig. I) enclosing a collecting band similar to that designed by 32 in connection with the cover 36, is disposed another device adapted to drag the corn plants towards the snapping cylinders 49—50, the construction of which has already been described. The shaft 46 of this device is rotated by gearing 47—48, transmitting the motion to the bell crank levers 40—41 through the pairs of toothed wheels 42—44 and 43—45. Said lever impart an alternate rocking motion to the combs 38—39 whereby the corn plants are dragged towards the cylinders 49—50.

The steering of the machine is effected actuating the lever 13 (Figs. I, II) fulcrumed at 15 and the new direction may be maintained by the aid of the locking lever co-acting with the teeth of the locking quadrant 12.

As aforesaid, the entire gathering mechanism is suspended from the truck (Fig. IV) swinging around driving shaft 20 and thus the height of the gathering and snapping mechanisms enclosed within the covers 36—37 may be adjusted at will. Such adjustments may be effected by the operator from his seat 18 actuating the lever 89 and therewith the lever 91 and their forward or backward movement, through the link 92, will raise or lower the bar 93, whereafter the device is locked in its position by means of the locking quadrant 88.

The entire mechanism may be operated or rendered inoperative during operation of the machine by means of the clutch mechanism 26 actuated by the double armed lever 27. This lever, in its lower position will render the mechanism operative whereas, when it is raised, the part 26 will be disconnected permitting the shaft 20 to rotate freely without rotating the gear 28.

We claim:—

1. A corn gathering and husking machine including in combination, a frame having one side portion inclined toward the front end of the other side portion, an axle mounted on the frame, supporting wheels on the axle one of which is spaced from the inclined side portion of the frame, a steering wheel at the forward end of the frame, upright brackets on opposite sides of the main frame, a shaft journalled in the brackets and having one portion projecting over the space between the inclined side portion of the frame and the wheel space therefrom and also operably connected with the supporting wheels, a secondary frame rockably supported on the shaft, gathering, snapping, conveying and husking means mounted on the secondary frame and operable from the shaft and positioned to one side of the main frame and over the space between the inclined side portion of the frame and the spaced wheel, means on the shaft to permit of the reverse movement of the frame without operating the gathering, snapping, conveying and husking means, and means for adjusting the secondary frame with respect to the main frame.

2. In a corn harvesting machine, an adjustably supported frame and snapping means mounted in said frame and including a pair of oppositely rotatably mounted snapping cylinders of cuneiform shape journalled in the frame so that the forward ends are slightly spaced to form a mouth while the upper portion of one cylinder is positioned slightly below the other cylinder so that when rotated toward each other a rotary scissors like cutting action is produced, and annular guides formed on the rear ends of said cylinders and coacting with each other during rotation of the cylinder to prevent relative longitudinal movement.

3. A machine as claimed in claim 2, wherein a series of suitably spaced spiral projections are formed on the outer surface of one of said cylinders and wherein the other of said cylinders is provided with a plurality of suitably spaced and similarly shaped notches having sharp angles with sharp edges for coinciding with the projections on the other cylinder during rotation of the cylinders, substantially as and for the purposes set forth.

4. In a corn harvesting machine of the character described, snapping means comprising a pair of oppositely rotatably mounted snapping cylinders of cuneiform shape so mounted with respect to each other that the upper portion of one cylinder is positioned slightly below the other cylinder and at a slight angle thereto, one of the cylinders being provided with a series of suitably spaced spirally arranged notches having sharp angles with sharp edges, suitably spaced spiral projections on the other cylinder coinciding with the notches during rotation of the cylinder, and annular guides on the upper portions of said cylinders, substantially as and for the purposes set forth.

In testimony whereof we have affixed our signatures.

JOSE GAYRAUD.
JUAN VICTOR CASTERAN.